(12) United States Patent
Mizutani

(10) Patent No.: US 7,920,585 B2
(45) Date of Patent: Apr. 5, 2011

(54) VEHICULAR COMMUNICATION DEVICE AND CONTROL INFORMATION GENERATING DEVICE

(75) Inventor: Taizo Mizutani, Nagoya (JP)

(73) Assignee: Denso Corporation, Kariya (JP)

( * ) Notice: Subject to any disclaimer, the term of this patent is extended or adjusted under 35 U.S.C. 154(b) by 271 days.

(21) Appl. No.: 12/156,516

(22) Filed: Jun. 2, 2008

(65) Prior Publication Data

US 2008/0298226 A1    Dec. 4, 2008

(30) Foreign Application Priority Data

Jun. 4, 2007    (JP) ................. 2007-148139

(51) Int. Cl.
*H04J 3/16* (2006.01)
(52) U.S. Cl. .................. 370/437; 370/480; 370/208
(58) Field of Classification Search .............. 370/480, 370/344, 208–210, 437; 340/310.11–310.18, 340/870.18, 870.17; 307/10.1, 310.11, 1, 307/3; 375/260, 219
See application file for complete search history.

(56) References Cited

U.S. PATENT DOCUMENTS

| 2003/0052771 A1* | 3/2003 | Enders et al. ............ 340/310.01 |
| 2006/0038445 A1 | 2/2006 | Yanagida et al. |

FOREIGN PATENT DOCUMENTS

| JP | 09-252267 | 9/1997 |
| JP | 2001-168776 | 6/2001 |
| JP | 2001-237904 | 8/2001 |
| JP | 2002-124895 | 4/2002 |
| JP | 2004-96331 | 3/2004 |
| JP | 2004328488 | * 11/2004 |
| JP | 2005-192166 | 7/2005 |
| JP | 2005-354159 | 12/2005 |
| JP | 2006-042276 | 2/2006 |
| JP | 2006-067421 | 3/2006 |
| JP | 2007-049531 | 2/2007 |

OTHER PUBLICATIONS

Translation of JP 2005-192166 A.*
Translation of JP 2001-237904 A.*
Office action dated Jan. 27, 2009 in Japanese Application 2007-148139.

* cited by examiner

*Primary Examiner* — Derrick W Ferris
*Assistant Examiner* — Christopher R Crompton
(74) *Attorney, Agent, or Firm* — Harness, Dickey & Pierce, PLC

(57) ABSTRACT

A vehicular communication device switches over a communication method between the OFDM method and the SS method. A PLC master set includes a LAN communication unit for performing data communications with control units such as an engine control ECU via an in-vehicle LAN. In the PLC master set, a microcomputer acquires the operating states of parts of the vehicle from various control units through the LAN communication unit, and uses the acquired operating states and control information stored previously to enable data communications without being affected by noises occurring in the parts of the vehicle by notifying a PLC slave set of a communication method in the PLC communication unit and a communication method with a sub-carrier set prohibited from use being set when a communication method is the OFDM method.

11 Claims, 7 Drawing Sheets

FIG. 3

| COMMUNICATION SUB-CARRIER→ | | OFDM | | | | | | | SS |
|---|---|---|---|---|---|---|---|---|---|
| | | 1 | 2 | 3 | 4 | 5 | 6 | .... | |
| ENGINE | ACCEL | × | | | × | | × | .... | — |
| | DECEL | | | | | | | .... | — |
| | STEADY | × | | | | | | .... | — |
| BRAKE | OFF | | | | | | | .... | — |
| | ON | | | × | | | × | .... | — |
| | ABS | × | | | | | × | .... | — |
| AIR-CONDITIONER | HIGH | × | × | × | × | × | × | .... | ○ |
| | LOW | | | | × | | | .... | — |
| | HALT | | | | | | | .... | — |
| ⋮ | ⋮ | ⋮ | ⋮ | ⋮ | ⋮ | ⋮ | ⋮ | ⋮ | ⋮ |

OFDM SPECTRUM (A)

SUB-CARRIER (B)

(C)

SS SPECTRUM

INVERSE SPREADING

| COMMUNICATION SUB-CARRIER→ | | OFDM | | | | | | | SS |
|---|---|---|---|---|---|---|---|---|---|
| | | 1 | 2 | 3 | 4 | 5 | 6 | .... | |
| ABS | INCREASE | × | | × | | × | × | .... | ON |
| | REDUCE | | | | | | | .... | — |
| | HOLD | | | | | | | .... | — |

| | SUB-CARRIER 1 | | | | SUB-CARRIER 2 | | |
|---|---|---|---|---|---|---|---|
| MODULATION | 64QAM | 16QAM | QPSK | BPSK | 64QAM | 16QAM | QPSK |
| STATE 1 | × | × | × | | × | × | |
| STATE 2 | × | | | | | | |

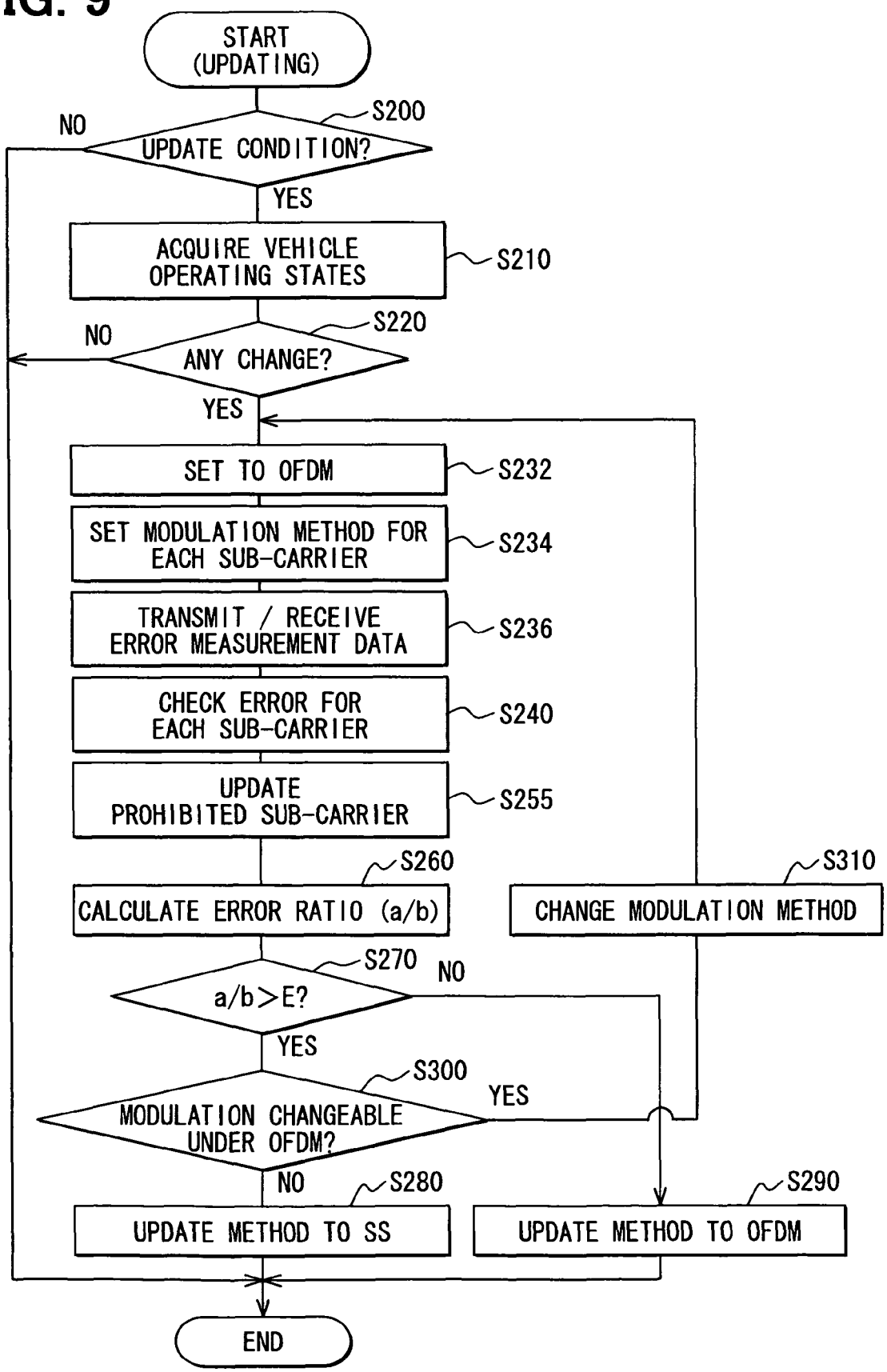

US 7,920,585 B2

VEHICULAR COMMUNICATION DEVICE AND CONTROL INFORMATION GENERATING DEVICE

CROSS REFERENCE TO RELATED APPLICATION

This application relates to and incorporates herein by reference Japanese Patent Application No. 2007-148139 filed on Jun. 4, 2007.

FIELD OF THE INVENTION

The present invention relates to a vehicular communication device that performs data communications with other on-vehicle devices through signal lines wired in the vehicle, and a control information generating device that generates control information necessary to control communication operation in the communication device.

BACKGROUND OF THE INVENTION

Conventionally, a vehicular power line communication device (PLC system, PLC: Power Line Communications) is known (e.g., JP 2006-67421A). In this system, a camera that is mounted in a vehicle such as a car to photograph its periphery, and a receiving device that receives a video signal from the camera to perform image processing and the like are connected to enable data communications with each other through an electric power line wired in the vehicle and transmit the video signal from the camera to the receiving device through the power line.

In this sort of PLC system, to achieve both high noise resistance and high speed data transmission, the orthogonal frequency division multiplexing (OFDM) method is generally used as a communication method (e.g., JP 2007-49531A).

In the PLC system that performs data communications by the OFDM method, some of sub-carriers allocated for communications are prohibited from use to avoid interference with other communication services using the same frequency band and normally perform data communications without undergoing the influence of noises.

Therefore, when the PLC system is formed in a vehicle, it is proposed to employ the OFDM method as a communication method for detecting the frequencies and levels of noises superimposed on a power line to enable normal data communications without undergoing the influence of the noises and switch sub-carriers used for communications according to the detection result.

However, the vehicle includes an engine and various noise generating sources (various actuators such as a motor, electromagnetic valve, and solenoid). Since the frequencies and levels of noises superimposed on a power line change frequently according to the operating states of parts that generate the noises, it is difficult to detect all noises superimposed on the power line and set a sub-carrier to be used for communications.

Moreover, since the vehicle includes numerous noise generating sources, such wide band pulse-related noises as to cover a frequency band of all sub-carriers usable in communications of the OFDM method may occur. Such wide band noises are caused to be mixed with all sub-carriers in communications of the OFDM method, and bring about the inexistence of sub-carriers usable for the communications, with the result that the communications are stopped as long as the wide band noises occur.

On the other hand, to prevent such a drawback, if the PLC system is formed in a vehicle, it is proposed to use the spread spectrum method (SS method) having higher noise resistance than the OFDM method. However, with the SS method, unlike the OFDM method, high speed communications cannot be achieved, and the amount of data transmittable and receivable per unit time becomes smaller.

SUMMARY OF THE INVENTION

The present invention therefore has an object to realize high speed data communications without undergoing the influence of noises superimposed on a signal line in a vehicular communication device that performs data communications with other on-vehicle devices by using the a power line wired in the vehicle.

A vehicular communication device according to one aspect of the present invention stores control information indicating a relationship with a communication method suitable for data communications between parts of a vehicle and a communication unit. The vehicular communication device performs data communications with other on-vehicle devices through a signal line wired in a vehicle and switches a communication method used for the data communications to any of plural communication methods. The vehicular communication device acquires the operating states of parts of the vehicle from control units controlling the parts of the vehicle, and determines a communication method suitable for data communications based on the acquired operating states and the stored control information, and switches over the communication method to the determined communication method.

BRIEF DESCRIPTION OF THE DRAWINGS

The above and other objects, features and advantages of the present invention will become more apparent from the following detailed description made with reference to the accompanying drawings. In the drawings:

FIG. 3 is a table explaining control information used to switch communication methods;

FIG. 9 is a flowchart showing control information update processing capable of updating modulation information of FIG. 8.

DETAILED DESCRIPTION OF THE PREFERRED EMBODIMENTS

Figure 1:
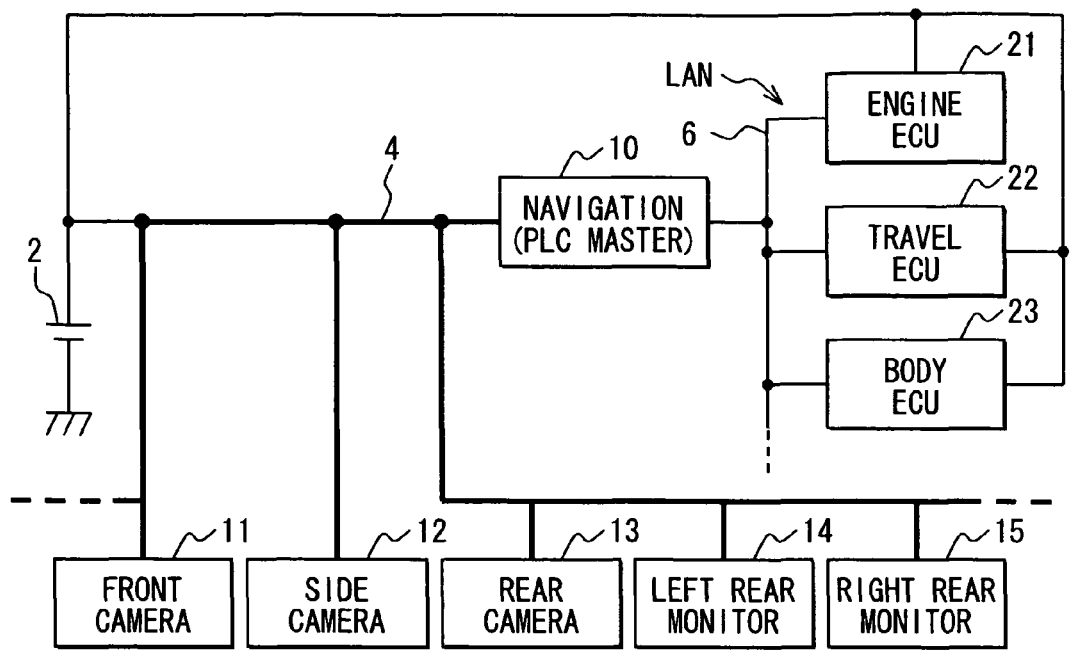
FIG. 1 is a block diagram showing a vehicular PLC system according to an embodiment of the present invention.

Referring to FIG. 1, a vehicular PLC system includes a car navigation device 10 provided near a driver's seat of a vehicle, an electric power supply wire (power line) 4 for supplying electric power from an on-vehicle battery 2 to various electrical parts of the vehicle, and on-vehicle devices 11 to 15 that input and output various information to and from the car navigation device 10.

The on-vehicle devices 11 to 15 that input and output information to and from the car navigation device 10 include a front camera 11 that photographs the front area of the vehicle, a side camera 12 that photographs the left area of the vehicle, a rear camera 13 that photographs the rear area of the vehicle, a left rear monitor for displaying images 14 provided at a rear seat in the left of the vehicle, and a right rear monitor for displaying images 15 provided at a rear seat in the right of the vehicle.

The car navigation device 10, as a PLC master set, performs data communications with the on-vehicle devices 11 to 15 via the power line 4 while controlling a communication method and the like in the on-vehicle PLC system. The on-vehicle devices 11 to 15, as PLC slave sets, perform data communications with the car navigation device 10 and other on-vehicle devices 11 to 15 via the power line 4 under communication control by the car navigation device 10.

For example, the cameras 11 to 13 transmit photographed images to the car navigation device 10 via the power line 4, and the monitors 14 and 15 receive video signals transmitted from the car navigation device 10 and display images.

In the vehicle, an in-vehicle LAN is formed by connecting plural electronic control units (ECU) 21 to 23 that control respective parts of the vehicle via a dedicated communication line 6 to share data necessary for control among the ECUs. The car navigation device 10 is also connected to the communication line 6 of the in-vehicle LAN.

The communication line 6 connects, the car navigation device 10, an engine control ECU 21 that controls an engine, a travel control ECU 22 that performs posture control and braking control during vehicle travel, and a body control ECU 23 that controls door locking/unlocking and an air conditioner. The car navigation device 10 acquires various types of information indicating the travel states of the vehicle and the operating states of parts of the vehicle from the ECUs 21, 22 and 23 via the communication line 6.

Figure 2:
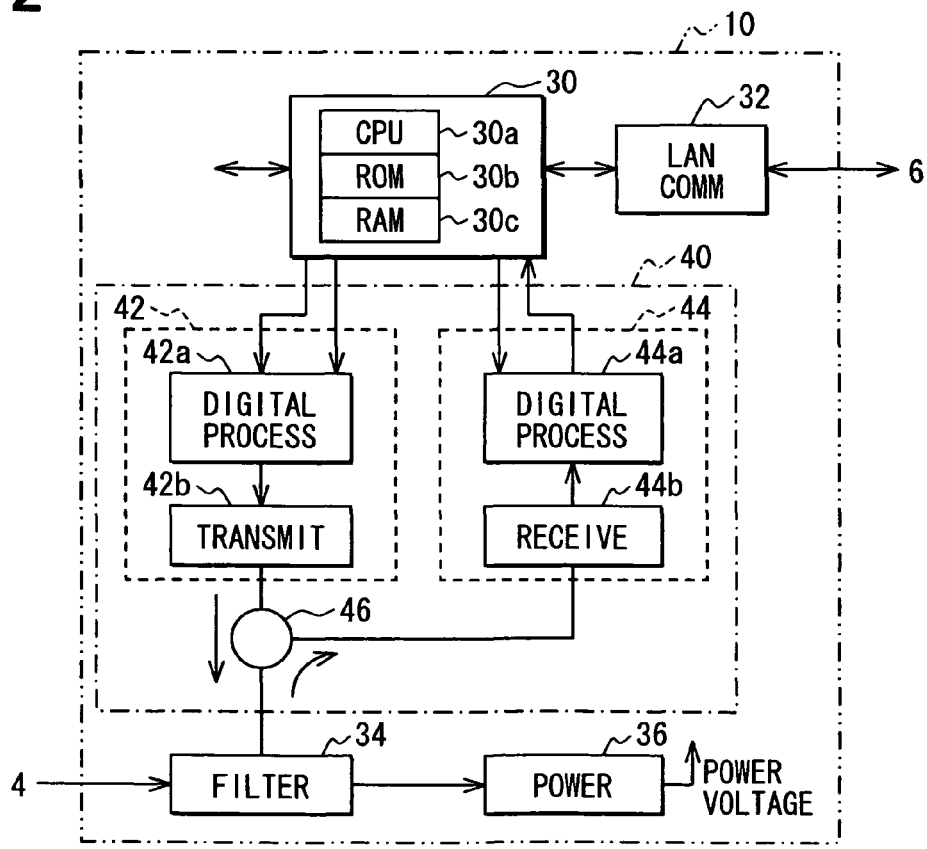
FIG. 2 is a block diagram showing a communication device of a PLC master set.

The car navigation device 10 is constructed as shown in FIG. 2, so that it displays images for travel guide including road maps in a display unit and displays photographed images by the cameras 11 to 13 according to a command from an operation unit. The car navigation device 10 includes a microcomputer 30 that performs various pieces of operation processing for such display/guide.

The microcomputer 30, which includes a CPU 30a, a ROM 30b, and a RAM 30c, is connected to an in-vehicle LAN (that is, the communication line 6) via a LAN communication unit 32, and connected to the power line 4 (PLC communication line) via a PLC communication unit 40 and a power separation filter 34.

The power separation filter 34 separates a battery voltage supplied from an on-vehicle battery 2 via the power line 4 from a communication signal for PLC (high frequency signal), supplies the battery voltage to a power circuit 36 that generates a power voltage (DC constant voltage), and allows the communication signal to pass between the power line 4 and the PLC communication unit 40.

The LAN communication unit 32 and the PLC communication unit 40 achieve data communications by the microcomputer 30 by modulating and demodulating transmission/reception data according to communication standards for the in-LAN and PLC. According to a command from the microcomputer 30, a communication method by the PLC communication unit 40 is switchable to any of the OFDM method and the SS method.

The PLC communication unit 40 includes a modulating unit 42 that converts transmission data outputted from the microcomputer 30 into a transmission signal, a demodulating unit 44 that restores reception data from a reception signal inputted via the power separation filter 34 from the power line 4, and a coupler (or transmission/reception switch) 46 that outputs a transmission signal outputted from the modulating unit 42 to the power separation filter 34 (further to the power line 4), and inputs a reception signal from the power separation filter 34 to the demodulating unit 44.

The modulating unit 42 includes a digital signal processing unit 42a that subjects transmission data to digital signal processing (IFFT, etc.) to generate a transmission signal of baseband, and a transmitting unit 42b that generates a transmission signal for communication by modulating a carrier wave in the generated transmission signal. The demodulating unit 44 includes a receiving unit 44b that demodulates a reception signal to a reception signal of baseband, and a digital signal processing unit 44a that subjects a reception signal demodulated in the receiving unit 44b to digital signal processing (FFT, etc.) to restore the reception signal.

By setting the processing operations of the respective digital signal processing units 42a and 44a of the modulating unit 42 and the demodulating unit 44 by the microcomputer 30, a communication method can be switched to any of the OFDM method and the SS method, and further the use of some of sub-carriers usable when the communication method is the OFDM method can be prohibited.

Since such a modulation/demodulation device that can change a communication method by digital signal processing is conventional, a detailed description of the modulating/demodulating units 42 and 44 is omitted here.

Other on-vehicle devices 11 to 15 constituting the PLC system along with the car navigation device 10 are also provided with the PLC communication unit 40 that can switch over communication methods like the car navigation device 10. Since its construction is the same as that of the car navigation device 10, a description of it is omitted.

The RAM 30c (specifically, a backup area that can hold data even when power is turned off) of the microcomputer 30 stores control information for changing communication methods in the PLC communication unit 40.

As shown in FIG. 3, the control information is used to set a communication method in the PLC communication unit 40 and a use-prohibited sub-carrier when the communication method is the OFDM method, according to the operating states of parts of the vehicle such as the acceleration, deceleration, and steady states of the engine, the ON, OFF, and ABS control states of a braking device, and the high revolution (H), low revolution (L), and halt states of a blower motor of the air conditioner. It is formed as a data map in which a flag (a mark X shown in a table: corresponding to sub-carrier information) indicating a use-prohibited sub-carrier prohibited in data communications by the OFDM method and a flag (a mark O shown in the table) specifying data communications by the SS method are set.

The microcomputer 30, in addition to the above operation processing for display and guide, performs communication method switching processing that changes communication methods of the PLC communication unit 40 based on the above control information, and control information update processing that updates the control information according to actual communication states.

Figure 4:
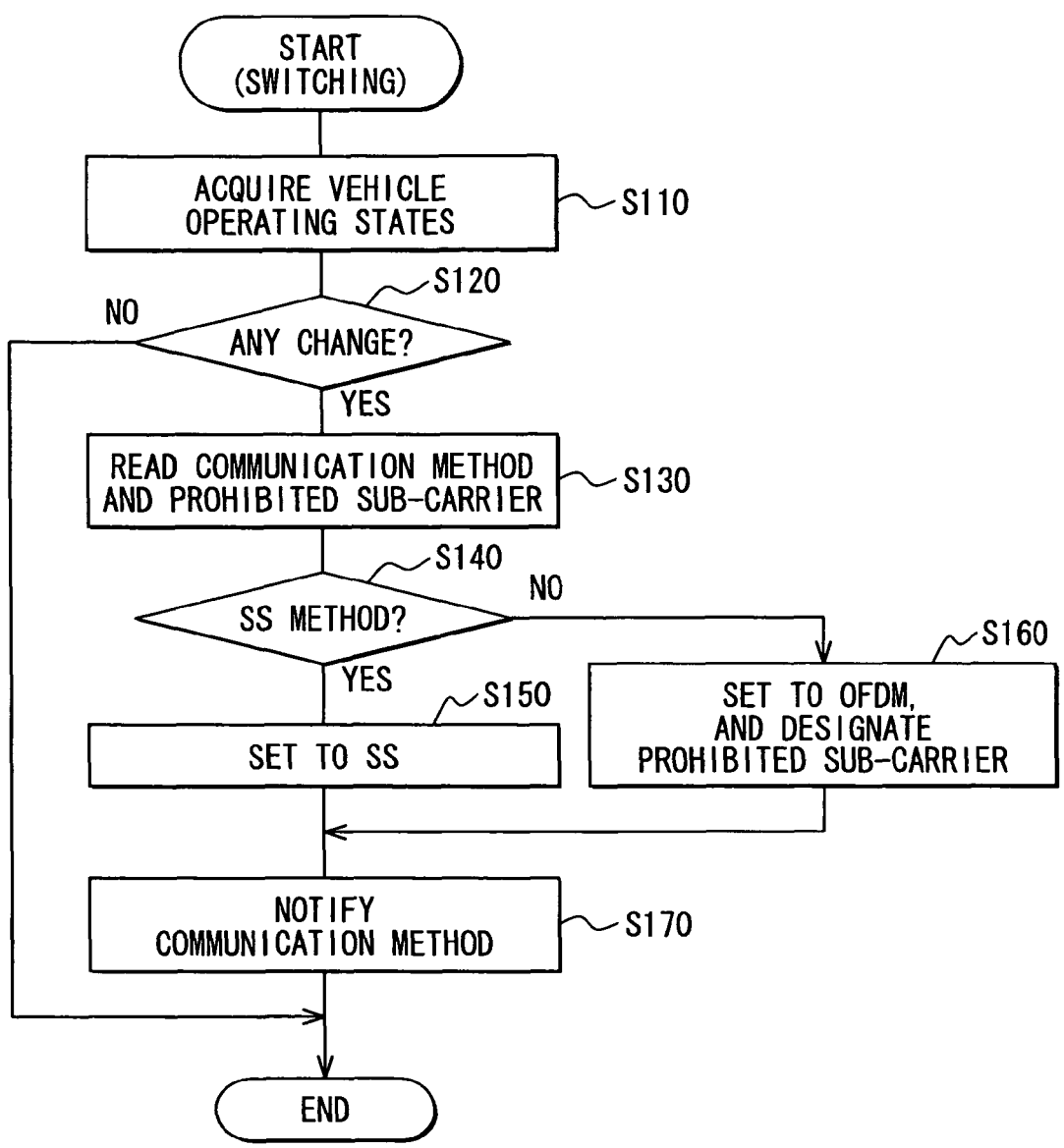
FIG. 4 is a flowchart showing communication method switching processing.

Hereinafter, the communication method switching processing and the control information update processing performed by the microcomputer 30 will be described with reference to FIG. 4 and FIG. 5, respectively.

The communication method switching processing (FIG. 4) is periodically performed as one of main routines in the microcomputer 30. When the processing is started, in S110, it acquires the operating states of parts of the vehicle from the ECUs 21 to 23 by performing communications with the ECUs 21 to 23 connected to the in-vehicle LAN via the LAN communication unit 32.

In S120, it compares the operating states acquired this time in S110 with those acquired previously to determine whether any one of the operating states of parts of the vehicle has changed. If the operating states of parts of the vehicle make no change, the communication method switching processing terminates temporarily. Otherwise, the processing proceeds to S130.

In S130, the processing uses the current operating states read in S110 to search control information stored in the RAM 30c, thereby reading a communication method and a use-prohibited sub-carrier that correspond to the current operating stat of parts of the vehicle. In S140, the processing checks whether the read communication method is the SS method.

When it is determined in S140 that the communication method is the SS method, the processing proceeds to S150 to set a communication method by the PLC communication unit 40 to the SS method. On the other hand, when it is determined in S140 that the communication method is the OFDM method, the processing proceeds to S160 to set a communication method by the PLC communication unit 40 to the OFDM method. At the same time, the processing sets the PLC communication unit 40 so that the use of use-prohibited sub-carriers read in S130 of all sub-carriers usable in communications of the OFDM method is prohibited in subsequent data communications. That is, the use-prohibited sub-carriers are designated.

In S170, the processing notifies the other on-vehicle devices 11 to 15 of the communication method set in S150 or S160 by commanding the PLC communication unit 40 to transmit notification data for indicating the communication method, and the communication method switching processing terminates temporarily. The notification data, whether the communication method is the OFDM method or the SS method, is set to a fixed value restorable in the other on-vehicle devices 11 to 15.

The control information update processing (FIG. 5) that is learning processing, like the communication method switching processing, is periodically performed as one of main routines in the microcomputer 30. When the processing is started, in S200, the processing checks whether the vehicle is idling (that is, no communication data flows through the PLC communication line (power line 4), to determine whether conditions for performing the control information update processing are satisfied. If conditions for performing the control information update processing are not satisfied, the control information update processing terminates temporarily. Conversely, if conditions for performing the control information update processing are satisfied, the processing proceeds to S210.

In S210, the processing acquires the operating states of parts of the vehicle from the ECUs 21 to 23 by performing communications with the ECUs 21 to 23 connected to the in-vehicle LAN via the LAN communication unit 32. In S220, it compares the operating states acquired this time in S210 with those acquired previously to determine whether any one of the operating states of parts of the vehicle has changed. If the operating states of parts of the vehicle make no change, the communication method switching processing terminates temporarily. Otherwise, the processing proceeds to S230.

In S230, the processing sets a communication method by the PLC communication unit 40 to the OFDM method that uses all sub-carriers, and transmits and receives error measurement data set in advance by commanding the modulating unit 42 of the PLC communication unit 40 to transmit error measurement data, and commanding the demodulating unit 44 to demodulate a transmission signal outputted from the modulating unit 42 to the power line 4.

In S240, the demodulating unit 44 checks whether reception data obtained for each sub-carrier is erroneous. In S250, the processing updates control information stored in the RAM 30c so that a sub-carrier determined as an error in S240 becomes a use-prohibited sub-carrier in a current operating state detected in S210.

After use-prohibited sub-carriers (sub-carrier information) of the control information is updated in S250, the processing proceeds to S260 to calculate an error occurrence ratio (a/b) by dividing the number of sub-carriers (a) determined as an error in S240 by the number of all sub-carriers (b) used to transmit the error measurement data. In S270, the processing checks whether the calculated error occurrence ratio (a/b) is greater than a switching determination value (E) of a preset communication method.

When it is determined in S270 that the error occurrence ratio is greater than the switching determination value, the processing determines that, in the current operating states of parts of the vehicle, wide band noises are superimposed on the power line 4, and it is difficult to perform normal data communications by the OFDM method, and proceeds to S280. In S280, the processing updates the control information stored in the RAM 30c so that a communication method in the current operating states becomes the SS method, and terminates temporarily.

When it is determined in S270 that the error occurrence ratio is equal to or less than the switching determination value, the processing determines that data communications by the OFDM method are possible, and proceeds to S290. In S290, the processing updates the control information stored in the RAM 30c so that a communication method in the current operating states becomes the OFDM method, and terminates temporarily.

As described above, in the vehicle PLC system, the microcomputer 30 of the car navigation device 10 serving as a PLC master set acquires the operating states of parts of the vehicle from the ECUs 21 to 23 controlling the parts of the vehicle, via the in-vehicle LAN, sets a communication method in the PLC communication unit 40 and use-prohibited sub-carriers, based on the acquired operating states and the control information stored in the RAM 30c, and further notifies the other on-vehicle devices 11 to 15 as communication parties of the set communication method.

The control information for thus setting a communication method and use-prohibited sub-carriers is updated by the microcomputer 30 commanding the PLC communication unit 40 to transmit and receive error measurement data, and determining an error occurring for each of sub-carriers at that time.

Figure 6A:
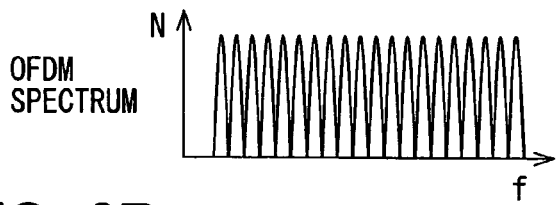
FIGS. 6A, 6B, 6C, 6D, and 6E are operation diagrams showing an operation of switching communication methods.
Figure 6B:
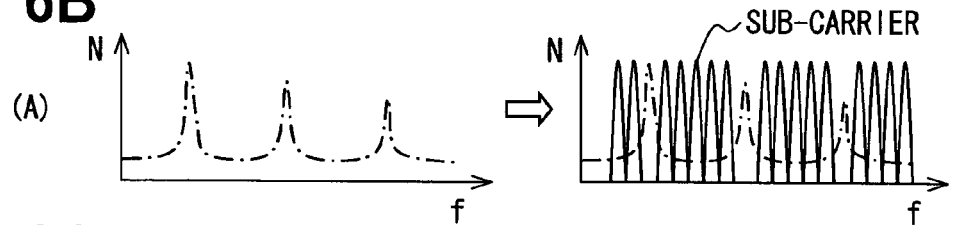
Figure 6C:
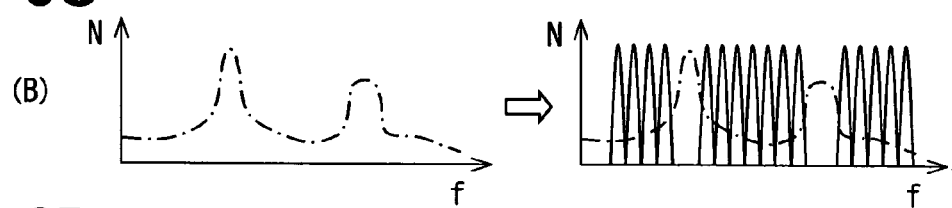
Figure 6D:
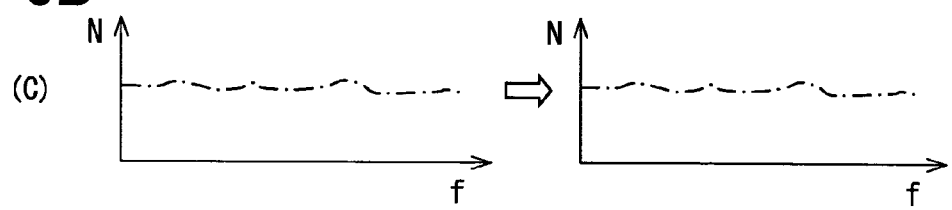
Figure 6E:
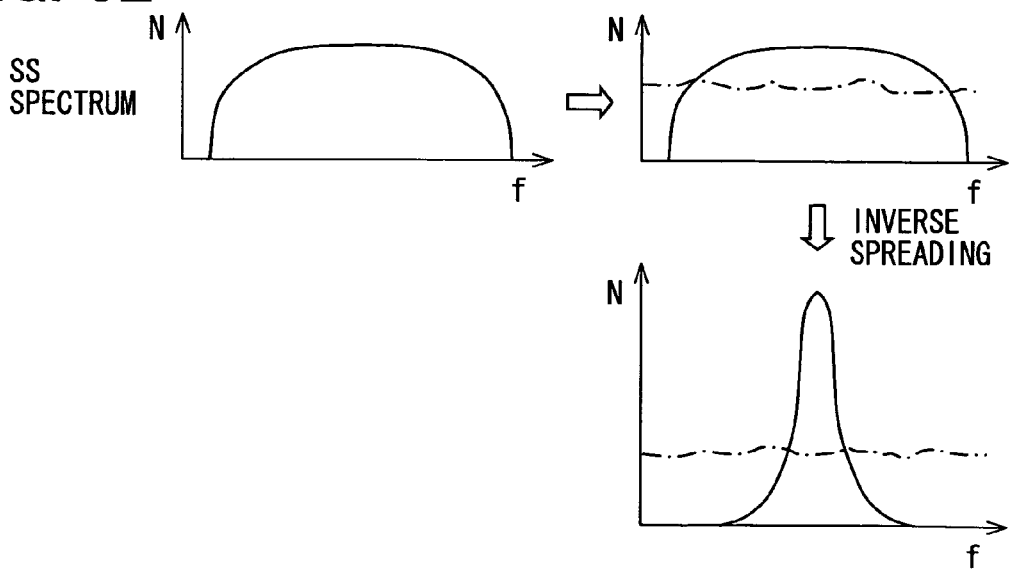

Therefore, when parts of the vehicle are in the operating state that does not generate noises (N) influencing data communications of the OFDM method over frequencies (f), as shown in FIG. 6A, high speed data communications using all sub-carriers by the OFDM method is achieved. Conversely, as shown in FIG. 6D, when parts of the vehicle are in the operating state (C) that generates wide band noises indicated by a one-dot chain line covering substantially all areas of frequency areas of sub-carriers usable in the OFDM method, there are not sub-carriers usable in the OFDM method. Therefore, a communication method is changed to the SS method shown in FIG. 6E that allows data to be transmitted and received without undergoing the influence of noises by signal processing (inverse spreading) in a receiving side.

The OFDM method is set as a communication method in the operating state in which an error occurrence ratio (a/b) of sub-carrier is equal to or less than a switching determination value (E) during updating of control information. However, sub-carriers determined as an error during updating of control information are set as use-prohibited sub-carriers. Therefore, even if the operating states of the vehicle are the operating states (A) and (B) in which the OFDM method is selected as shown in FIGS. 6B and 6C, the use of sub-carriers corresponding to the noises is prohibited when noises to influence some sub-carriers are generated. Thus, the communication quality of data communications by the OFDM method is increased.

In this embodiment, the communication method used for data communications in the PLC system is determined based on the operating states of parts of the vehicle and control information stored in the RAM 30c. Therefore, by finely dividing the operating states of the parts of the vehicle and generating the control information correspondingly, communication methods can be switched more accurately correspondingly to vehicle states (noises).

Figures 7A, 7B, 8:
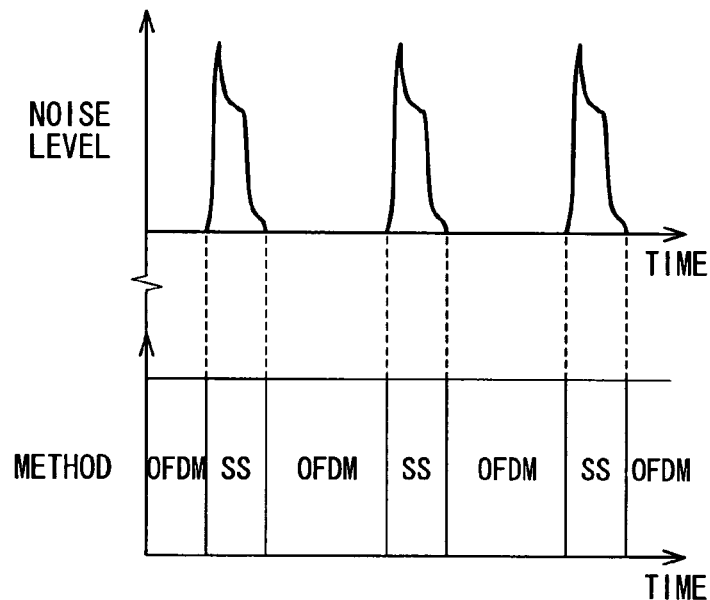
FIGS. 7A and 7B are a table and an operation diagram showing the operation of switching communication methods with control information set more finely.
FIG. 8 is a table showing modulation information afforded as one of pieces of control information.

For example, as shown in FIG. 7A, control information about a communication method and a use-prohibited sub-carrier may be set for each of ABS control states of brake by dividing the states into increase, reduction, and holding of brake hydraulic pressure, thus more finely defining the control information shown in FIG. 3.

By thus setting the operating states of parts of the vehicle more finely during generation of the control information, as shown in FIG. 7B, the communication method is switched to the SS method only when wide band noises occur by the operation of an electromagnetic valve to increase brake hydraulic pressure during execution of ABS control. Even during execution of ABS control, in the operating state of increasing, reducing, or holding brake hydraulic pressure, the communication method can be set to the OFDM method to secure communication speeds.

The car navigation device 10 serving as a PLC master set corresponds to a vehicle communication device. The PLC communication unit 40 of the car navigation device 10 corresponds to a communication means, the RAM 30c within the microcomputer 30 corresponds to a storage means, and the communication method switching processing performed in the CPU 30a of the microcomputer 30 corresponds to a control means.

The car navigation device 10 also has functions as a control information generating device. The functions as the control information generating device are achieved by the CPU 30a of the microcomputer 30 performing control information update processing. The processing of S230, S240, and S260 of the control information update processing corresponds to a measurement means, the processing of S270 corresponds to a communication method determination means, and the processing of S250, S280, and S290 corresponds to a control information generation means.

The present invention is not limited to the above embodiment, but may be embodied in various ways within a scope not departing from the purport of the present invention.

For example, in the embodiment, sub-carriers in which a communication error occurs due to the influence of noises during data communications by the OFDM method are recorded in control information as use-prohibited sub-carriers. However, the sub-carriers may be used by changing a modulation method at the time of data communications.

Specifically, even when the modulation method of sub-carrier is 64 QAM, if the modulation method is changed to 16 QAM, QPSK, or BPSK, although a transmittable amount of data (the number of bits) decreases, a communication failure may be prevented from occurring.

Accordingly, in the control information shown in FIG. 3, for flagged sub-carriers (X-marked sub-carrier information) as use-prohibited carriers, as shown in FIG. 8, modulation information that enables the distinguishment between modulation methods causing communication failures and those not causing communication failures among plural modulation methods 64 QAM, 16 QAM, QPSK, and BPSK is afforded. In the communication method switching processing of FIG. 4, in S160 executed when the OFDM method is selected as a communication method, sub-carriers causing communication failures for all modulation methods are set as use-prohibited sub-carriers, and for other sub-carriers, based on the modulation information added to the control information, a modulation method enabling the highest speed communication without causing communication failures may be set.

By this method, as modulation methods change from 64 QAM to 16 QAM, QPSK, and BPSK in this order, a transmittable amount of data using the sub-carriers decreases (communication speed decreases). However, since the probability that a communication method is switched to the SS method decreases, reduction in communication speed can be curved in comparison with the above.

In this way, to add the modulation information shown in FIG. 8 to the control information, the control information update processing may be performed according to a procedure shown in FIG. 9.

Figure 5:
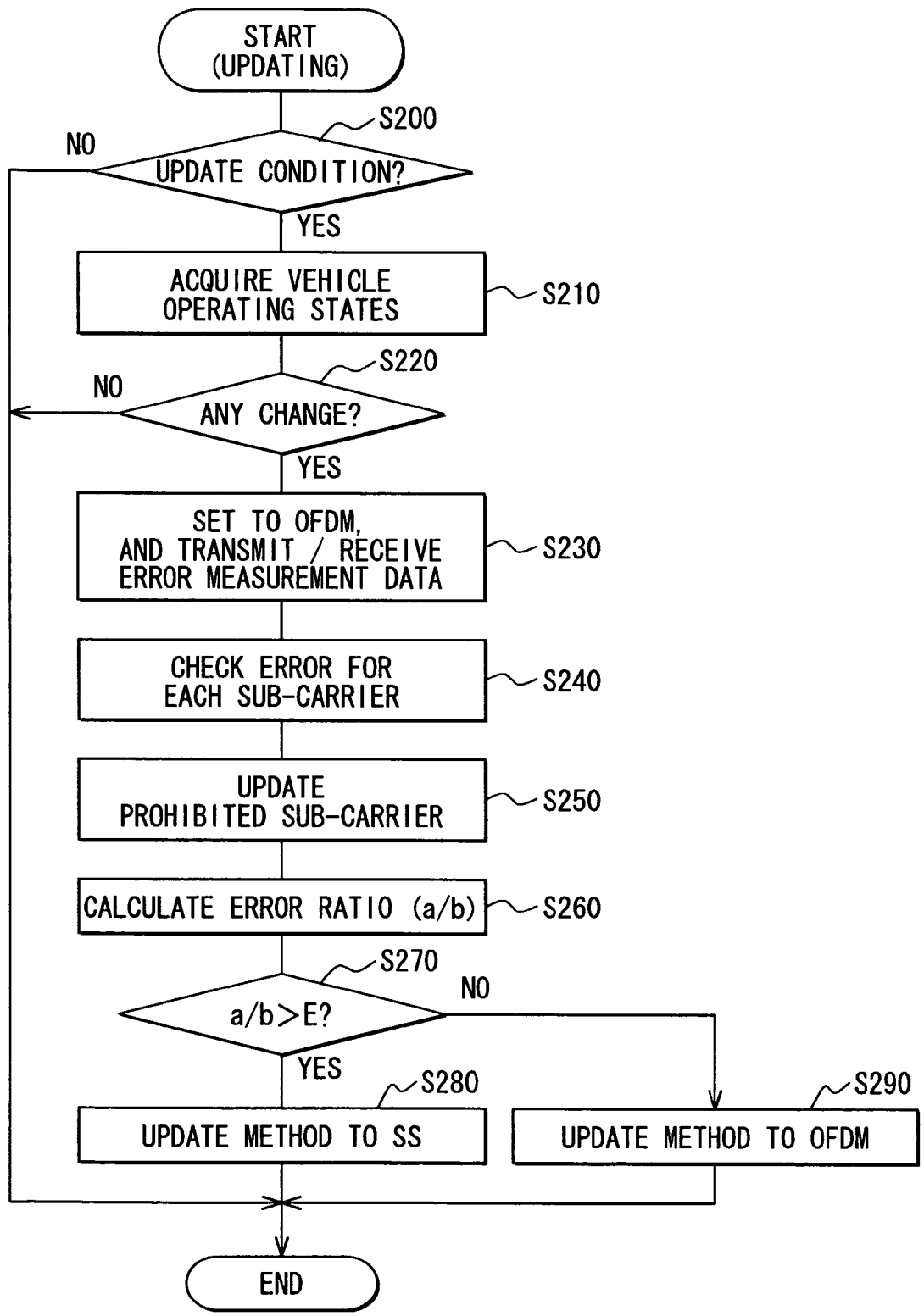
FIG. 5 is a flowchart showing control information update processing.

Specifically, although the control information update processing shown in FIG. 9 is basically the same as that shown in FIG. 5, when it is determined in S270 that an error occurrence ratio (a/b) is greater than a switching determination value (E), the processing proceeds to S300 to check whether the modulation method of a sub-carrier (error occurrence sub-carrier) determined as an error in S240 can be changed, in a state in which a communication method is held at the OFDM method.

When it is determined in S300 that the modulation method cannot be changed, the processing proceeds to S280 to update the control information so that the communication method in current operating states becomes the SS method. When it is determined in S300 that the modulation method can be changed, the processing proceeds to S310, which sets a modulation method less susceptible to noises than the current modulation method as a modulation condition of the error occurrence sub-carrier, and returns to S232.

The initial value of sub-carrier modulation method is a modulation method (e.g., 64 QAM) most susceptible to noises, of modulation methods settable for the PLC communication unit 40. In S310, a modulation condition is set so that modulation methods change in stages from the initial value to modulation methods (16 QAM, QPSK, BPSK, . . . ) susceptible to noises.

S232 is executed in place of S230 shown in FIG. 5 when it is determined in S220 that the operating states of parts of the vehicle have changed. S232 sets a communication method by the PLC communication unit 40 to the OFDM method that uses all sub-carriers. In S234, the processing sets the modulation method of each sub-carrier in the PLC communication unit 40 according to preset modulation conditions (initial value: 64 QAM), and in S236, commands the PLC communication unit 40 to transmit or receive error measurement data.

After commanding the PLC communication unit 40 to transmit or receive error measurement data in S236, the processing, like the above embodiment, proceeds to S240 to check reception data for an error for each of sub-carriers. After that, in S252, the processing updates the control information and the modulation information stored in the RAM 30c so that a sub-carrier determined as an error in S240 becomes, in S255, a use-prohibited sub-carrier in the current operating state of parts of the vehicle and the current modulation method.

Therefore, according to the control information update processing shown in FIG. 9, besides the control information containing carrier information shown in FIG. 3, the modulation information shown in FIG. 8 can be updated according to vehicle states. Although, in this embodiment, when a sub-carrier is prohibited from use, the transmission of the sub-carrier is stopped as shown in FIG. 6, it may continue to be transmitted unless information of the sub-carrier is used in a receiving side.

In the above embodiment, the control information update processing for implementing the functions as the control information generating device is performed in the car navigation device 10 serving as a PLC master set. However, the control information update processing may be performed by a device for generating control information (that is, control information generating device) connected to the in-vehicle LAN and the PLC communication line, like the car navigation device 10, to generate (or update) control information used by the car navigation device 10 for the communication method switching processing.

In the above embodiment, the car navigation device 10 serving as a PLC master set sets a communication method in the PLC system and notifies other on-vehicle devices serving as PLC slave set of the communication method. However, communication devices constituting the PLC system may set a communication direction individually.

In the above embodiment, the PLC system performs data communications by using the power line 4 that supplies power from the on-vehicle battery 2 to parts of the vehicle. However, the present invention can also be applied to a system that performs data communications by using conducting lines, twisted pair lines, and the like superficially coated with insulating materials.

What is claimed is:

1. A vehicular communication device comprising:
    means for performing data communications with other on-vehicle devices through a signal line wired in a vehicle and switching a communication method used for the data communications to any of a plurality of communication methods;
    means for storing control information indicating a relationship with a communication method suitable for data communications between parts of the vehicle and the performing means; and
    means for acquiring operating states of parts of the vehicle from a control unit controlling the parts of the vehicle, determining a communication method suitable for the performing means to perform data communications, based on the acquired operating states and the control information stored in the storing means, and switching a communication method used by the performing means for data communications to the determined communication method; wherein
    the performing means is capable of switching the communication method used for the data communication to a first communication method for high speed communications and a second communication method having a lower communication speed and higher noise resistance than the first communication method;
    the control information is set such that the first communication method is normally selected, and the second communication method is selected when the operating states of parts of the vehicle have changed into those in which a communication failure could occur due to noises occurring in the signal line with the first communication method;
    the first communication method is a orthogonal frequency division multiplexing method, and the second communication method is a spread spectrum method;
    the control information contains sub-carrier information defining sub-carriers causing communication failures for each of the operating states of parts of the vehicle, when the performing means performs the data communication method by the orthogonal frequency division multiplexing method; and
    the acquiring means, when the performing means selects the orthogonal frequency division multiplexing method as the communication method used for data communications, based on the sub-carrier information, eliminates sub-carriers causing the communication failures from sub-carriers used by the performing means to perform data communications by the orthogonal frequency division multiplexing method, or avoids the use of information transmitted using the sub-carriers.

2. The vehicular communication device according to claim 1, wherein:
    the control information contains, in addition to the sub-carrier information, modulation information indicating modulation methods for sub-carriers not causing communication failures when the performing means performs data communications by the orthogonal frequency division multiplexing method; and
    the acquiring means, when the performing means selects the orthogonal frequency division multiplexing method as the communication method used for data communications, based on the modulation method, sets modulation methods for sub-carriers used by the performing means to perform data communications by the orthogonal frequency division multiplexing method.

3. The vehicular communication device according to claim 1, wherein:
    the signal line is a power line for supplying electric power to parts of the vehicle.

4. The vehicular communication device according to claim 3, wherein:
    the power line connects the other vehicle devices and the control unit of the parts of the vehicle to a battery of the vehicle; and
    the performing means is connected to the control unit through a communication line different from the power line for data communications with the control unit through the communication line; and
    the acquiring means switches a communication method of only the power line.

5. The vehicular communication device according to claim 4, wherein:
    the control unit is for controlling at least one of an engine, a brake and an air conditioner of the vehicle.

6. The vehicular communication device according to claim 5, wherein:
    the other vehicle devices includes at least one of a navigation device, a camera and a monitor of the vehicle.

7. The vehicular communication device according to claim 1, wherein the control information is set such that only the first communication method is normally set.

8. The vehicular communication device according to claim 7, wherein only the second communication method is selected when the operating states of parts of the vehicle have changed into those in which a communication failure could occur due to noises occurring in the signal line with the first communication method.

9. A control information generating device comprising:
a vehicular communication device comprising:
means for performing data communications with other on-vehicle devices through a signal line wired in a vehicle and switching a communication method used for the data communications to any of a plurality of communication methods;
means for storing control information indicating a relationship with a communication method suitable for data communications between parts of the vehicle and the performing means; and
means for acquiring operating states of parts of the vehicle from a control unit controlling the parts of the vehicle, determining a communication method suitable for the performing means to perform data communications, based on the acquired operating states and the control information stored in the storing means, and switching a communication method used by the performing means for data communications to the determined communication method; wherein
the control information generating device generates the control information used by the acquiring means to control the operation of the performing means in the vehicular communication device, the control information generating device comprising:
means for measuring a ratio of communication errors occurring in the data communications;
means for determining, based on the measured ratio of communication errors, a communication method suitable for data communications in the operating states; and
means for generating the control information by storing the communication method determined by the determining means in a storage medium in association with the operating states of the parts of the vehicle; wherein
the measuring means detects sub-carriers causing communication failures by performing data communications by an orthogonal frequency division multiplexing method, and measures a ratio between the number of the detected sub-carriers and the number of sub-carriers used in data communications of the orthogonal frequency division multiplexing method as the ratio of the communication errors; and
the determining means sets the orthogonal frequency division multiplexing method as a communication method as the data communications unless the ratio of communication errors measured by the measuring means reaches a preset switching determination value, and if the ratio of communication errors reaches the switching determination value, sets the spread spectrum method as a communication method as the data communications.

10. The control information generating device according to claim 9, wherein:
the generating means stores, in addition to the communication method determined in the determining means, sub-carrier information indicating sub-carriers causing communication failures when the measuring means performs data communications by the orthogonal frequency division multiplexing method in a storage medium in association with the operating states of the parts of the vehicle.

11. The control information generating device according to claim 9, wherein:
the determining means, when the ratio of communication errors measured in the measuring means reaches the switching determination value, checks whether a modulation method for a sub-carrier causing a communication failure can be changed to a modulation method resistant to communication failures, and if the modulation method can be changed, makes the measuring means change the modulation method for the sub-carrier to a modulation method resistant to communication failures to perform data communications by the orthogonal frequency division multiplexing method, thereby measuring again the ratio of the communication failures; and
the generating means stores, in addition to the communication method determined in the determining means, the sub-carrier information, and modulation information indicating modulation methods for sub-carriers not causing communication failures when the measuring means performs data communications by the orthogonal frequency division multiplexing method, in a storage medium in association with the operating states of the parts of the vehicle.

* * * * *